Sept. 29, 1931.  H. J. MURPHY  1,825,411
SUCTION MOTOR
Filed Jan. 9, 1926
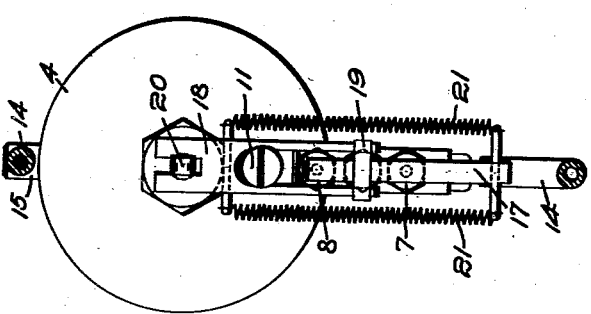
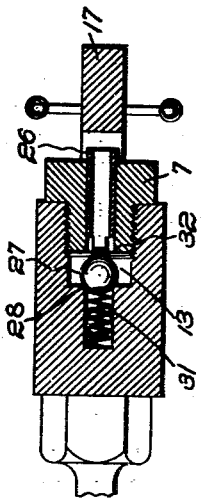
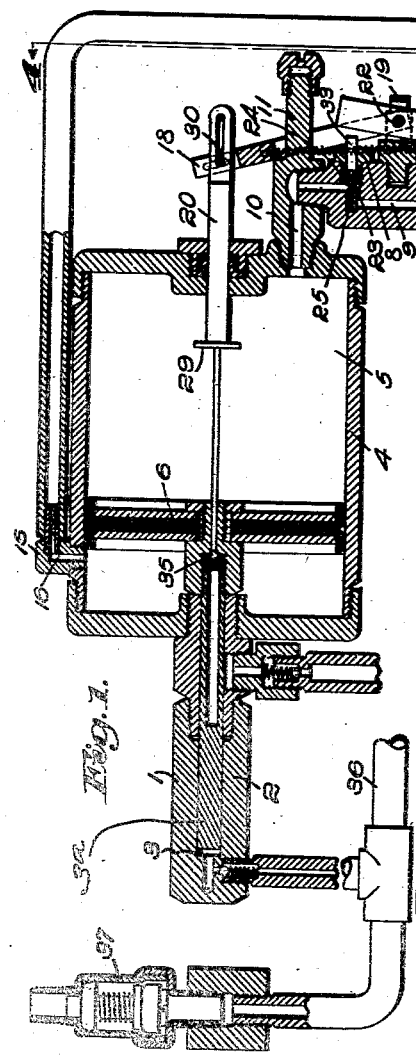
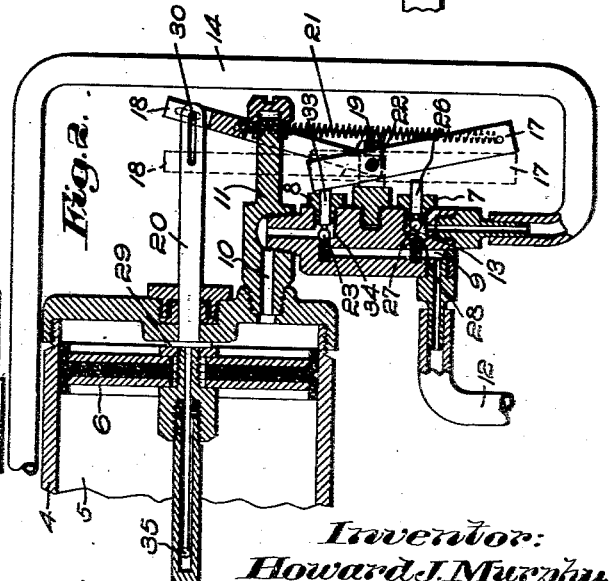
Inventor:
Howard J. Murphy,
by Emery, Booth, Janney & Varney
Attys.

Patented Sept. 29, 1931

1,825,411

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

SUCTION MOTOR

Application filed January 9, 1926. Serial No. 80,249.

This invention aims to provide improvements in lubricating apparatus, particularly, though not exclusively, useful in connection with central lubricating systems.

In the drawings, which illustrate a preferred embodiment of my invention:—

Figure 1 is a longitudinal section through a suction-operated lubricant pump and valve means associated therewith, in connection with a portion of the pipe system and one of the lubricant cups;

Fig. 2 is a section of a portion of the rear end of the lubricant pump, showing one extreme position of the valve means and vacuum-operated piston;

Fig. 3 is a section on the line 3—3 of Fig. 1, showing in elevation the lubricant pump and associated valve means; and Fig. 4 is an enlarged section on the line 4—4 of Fig. 1, showing one of the check valves and its associated parts.

Referring to the drawings, I have illustrated a portion of a central lubricating system particularly useful in connection with lubricating various parts of a motor-driven vehicle.

The parts of the system, except the control means for the suction driven lubricant pump, are substantially the same as those shown and described in my copending application Serial No. 80,245 filed herewith. Instead of the slide valve mechanism shown and described in the above-mentioned application, I have provided a snap valve mechanism which is operated by a rod connected to the piston in the suction chamber of the lubricant pump as shown in Figs. 1 and 2.

The pump 1 illustrated may be connected in any suitable manner with the rest of the system and includes a lubricant cylinder 2 having a chamber 3 of relatively small cross-sectional area in which is reciprocated a piston 3a and a second cylinder 4 having a suction or vacuum chamber 5 of relatively larger cross-sectional area. The usual piston 6 is provided in the chamber 5 and is connected with the piston 3a operable in the chamber 3 to force lubricant therefrom under pressure.

The snap valve device may be secured directly to the back end of the cylinder 4. This device is provided with two check valves for controlling the admittance of air and suction to opposite ends of the chamber 5. Both valves are similar in construction, each having a ball check, a spring pressing against the ball check and a hollow stem bearing against the ball check at the opposite side from which the spring bears. A passage 9 leads through the housing of the valve device and is connected at one end with a passage 10 in a part 11 which is screwed directly to the back end of the cylinder 4. The passage 10 communicates directly with the chamber 5, as shown in Figs. 1 and 2. The other end of the passage 9 communicates with a conduit 12, through which suction is admitted to the valve device. A passage 13 connects the passage 9 with a conduit 14 leading to an elbow 15 adjacent to the front end of the cylinder. The elbow has a passage opening into the side of the cylinder 4, as shown in Fig. 1. Screw plugs 7 and 8 are provided at each check valve to permit assembly thereof and each plug carries one of the hollow stems and provides one of the seats for the ball checks as shown in Fig. 3.

One check valve is located in the passage 9 and the other is located in the passage 13. Each valve has two cooperating seats against which the ball checks may be seated to cut off either the suction or the atmosphere as more fully hereinafter described.

The means for operating the valves includes a pair of levers 17 and 18 pivoted upon a support 19 secured to the casing of the valve device and extending in opposite directions. The lever 17 operates the check valves and the lever 18 is connected through a stem 20 with the piston 6. Lost motion is provided between the stem and the lever and between the stem and the piston for purposes more fully hereinafter described. Springs 21 are provided at the sides of the levers and connected thereto adjacent the outer ends of the levers (Fig. 4) to snap them into either the position shown in Fig. 1 or Fig. 2, after they have been moved slightly beyond a vertical plane through the center of the pivot 22 for the levers.

Assuming that suction is present in the conduit 12, the operation of the system is as follows. If the relative position of the parts of the system are as shown in Fig. 1, suction is admitted to the chamber 5 through the passages 9 and 10, the ball check 23 being held against the seat 24 by the spring 25 to exclude atmosphere from the passage 9. At the same time the lever 17 presses inwardly upon the hollow stem 26 and forces the ball check 27 against the seat 28 to exclude suction from the passage 13 while permitting atmosphere to pass through the hollow stem 26 into the chamber 13 as shown in Fig. 3. The atmosphere or air then passes through the conduit 14 and passage 16 into the chamber 5 at the forward side of the piston 6. The atmospheric pressure together with the partial vacuum created by suction at the rear side of the piston 6 cooperate to drive the piston 6 toward the rear end of the chamber 5.

The levers 17 and 18 and the rod 20 remain in the positions shown in Fig. 1 until the piston 6 engages the shoulder 29 on the rod 20. Then as the piston continues toward the end of its stroke the rod 20 is moved with it to move the levers 17 and 18 to the dotted line positions shown in Fig. 2. In the dotted positions the levers 17 and 18 are slightly beyond a vertical center line through the pivot 19 and the springs 21 then act to snap the levers into the full line position shown in Fig. 2. During this operation, the pin 30 between the lever 18 and the rod 20 is free to travel in the slots in the lever and rod to permit the movement described.

By snapping the levers into the position shown in Fig. 2, the lever 17 moves away from the hollow stem 26 and permits the spring 31 to force the ball check 27 against the seat 32, thereby cutting off the admittance of atmospheric pressure to the forward side of the chamber while permitting suction to operate through the passage 13, conduit 14 and passage 16 and form a partial vacuum at the forward side of the piston 6 in the chamber 5. While the lever 17 releases the check ball 27 for the purposes just described, it presses against the stem 33 of the other check valve and forces the ball check 23 against the seat 34 and closes the passage 9 to admittance of suction to the passage 10. Atmosphere is now free to pass through the hollow stem 33, a portion of the passage 9 and the passage 10 into the chamber 5 at the rear side of the piston 6 (Fig. 2) to force the piston toward the front end of the chamber 5.

During the return stroke of the piston 6, it moves relative to the stem 20 until it contacts with the upset end 35 of the rod 20. Then the piston moves the rod which in turn pulls the levers over the center so that they may snap into the position shown in Fig. 1 to again reverse the atmosphere and suction.

The piston 6 reciprocates the piston 3a to force lubricant therefrom through the pipe system 36 to the lubricant cups 37 in substantially the same manner as shown and described in the above-mentioned copending application. One or more strokes of the piston 3a may be necessary to fill the cups 37 and the operation of the piston 6 continues until suction is cut off from the conduit 12.

While I have shown and described a preferred embodiment of my invention, it should be understood that changes involving omission, substitution, alteration and reversal of parts, and even changes in the mode of operation may be made without departing from the scope of my invention, which is best defined in the following claims.

Claims:

1. In apparatus of the class described, a suction operated motor comprising a chamber, a piston in said chamber operated by admitting atmospheric pressure to one side thereof while a partial vacuum is created at the other side by suction, a valve device connected to a source of suction supply and communicating with said chamber at both ends, check valves for controlling admission of atmosphere and suction to said chamber, each check valve including a ball check, a hollow movable stem through which atmosphere may be admitted to a passage leading to one end of said chamber, a spring normally pressing said ball check against a seat adjacent the inner end of said stem to prevent passage of atmosphere into said chamber while admitting suction to said chamber through the passage which leads to said chamber, and spring pressed leverage means adapted to press against one of said hollow stems to press one of said ball checks against a seat to cut off suction from one side of said piston and admit atmosphere while the other ball check admits suction to the opposite side of the piston and cuts off the atmosphere.

2. In apparatus of the class described, a suction operated motor comprising a chamber, a piston in said chamber operated by admitting atmospheric pressure to one side thereof while a partial vacuum is created at the other side by suction, a valve device for controlling the admission of atmosphere and suction to said chamber, passages and conduits connecting said device with said chamber at opposite sides of the piston in said chamber, a plurality of valves carried by said valve device to regulate the admission of the atmosphere and suction, each valve including a ball check having two spaced apart seats so that the ball check my stop the admission of either atmosphere or suction while admitting the other to one side of said piston, a spring normally pressing said ball check against one of said seats and a hollow stem adapted to be pressed to move said ball check against the other of said seats and admit air to said chamber.

3. In apparatus of the class described, a suction operated motor comprising a chamber, a piston in said chamber operated by admitting atmospheric pressure to one side thereof while a partial vacuum is created at the other side by suction, a valve device for controlling the admission of atmosphere and suction to said chamber, passages and conduits connecting said device with said chamber at opposite sides of the piston in said chamber, a plurality of valves carried by said valve device to regulate the admission of the atmosphere and suction, each valve including a ball check having two spaced apart seats so that the ball check may stop the admission of either atmosphere or suction while admitting the other to one side of said piston, a spring normally pressing said ball check against one of said seats, a hollow stem through which atmosphere is admitted to said chamber, and means operated by the piston in said chamber to press said stem against said ball check to urge it against said other seat.

In testimony whereof, I have signed my name to this specification.

HOWARD J. MURPHY.